United States Patent [19]

Soriano G. et al.

[11] 4,326,884

[45] Apr. 27, 1982

[54] PROCESS FOR OBTAINING METAL VALUES FROM ORES CONTAINING SUCH METALS AS OXIDES OR CONVERTIBLE INTO SUCH OXIDES

[75] Inventors: Vicente Soriano G.; Carmin Marino A.; Enrique R. Valdez, all of Mexico City, Mexico

[73] Assignee: Comision de Fomento Minero, Mexico City, Mexico

[21] Appl. No.: 149,395

[22] Filed: May 13, 1980

[51] Int. Cl.$^3$ .................. C22B 13/02; C22B 17/02; C22B 19/04

[52] U.S. Cl. .......................... 75/71; 75/14; 75/77; 75/88

[58] Field of Search ............ 75/88, 86, 87, 63, 71, 75/77, 78, 14; 266/148

[56] References Cited

U.S. PATENT DOCUMENTS 2,559,631  7/1951  Kalbach .......................... 75/14 X
3,136,627  6/1964  Caldwell, Jr. et al. ............ 75/63
3,449,116  6/1969  Derham ........................... 75/88 X
3,592,631  7/1971  Cattelain ......................... 75/88

Primary Examiner—M. J. Andrews
Attorney, Agent, or Firm—Ladas & Parry

[57] ABSTRACT

The invention relates to a process for obtaining metal values from ores containing such metals as oxides or convertible into such oxides, the process comprises grinding an ore at room temperature; reducing said ground ore with reducing agents to a gaseous mix comprising gangue; condensing the gaseous mix with water, to a metals and gangue solution as a product and inert gases as a second product which are vented to the atmosphere; separating water (which is further recycled) from said metals and gangue solution via sedimentation, filtration and drying to obtain a cake; subjecting said cake to gaseous separation in order to yield the metals mix in gaseous form as product and gangue as a residue; selectively condensing said metals mix into each metal component according to their different condensation temperatures.

8 Claims, No Drawings

PROCESS FOR OBTAINING METAL VALUES FROM ORES CONTAINING SUCH METALS AS OXIDES OR CONVERTIBLE INTO SUCH OXIDES

PRIOR ART

The field of the invention relates to the extraction of metal values using pyrometallurgic procedures, starting from ores containing them in the form of oxides or convertible into such oxides. Typical examples of such ores are those containing primarily Zn, Cd and Pb and also minor amounts of Cu, Fe, Ag, Au, . . . etc.

Until now, there have been only two processes known for the metallurgical extraction of metals such as zinc that are present as oxides in ores, namely: (a) pyrometallurgical processes and (b) electrolytic processes.

(a) Pyrometallurgical processes.

Considering ores containing zinc oxide as a typical example, these processes essentially involve reducing with coke the zinc oxide in such ores in furnaces at high temperature and then recovering the zinc in liquid state by direct condensation of the gaseous effluent from the furnaces. These pyrometallurgical processes have been forced out of the commercial market, because they demand high capital investment, consume great quantities of energy and have very high maintenance costs, their operation is labor intensive, they produce a low output and have adverse ecological effects. Also, these processes have no versatility from the stand-point of the reducing agent, since necessarily for their operation, all of them use coke.

For a better information of the background of the present invention, a brief description follows of the furnaces that have been used in the past in the pyrometallurgical recovery of zinc. Until the end of the XIX century, zinc was produced in small retorts, using ores containing zinc oxide as raw material, which were mixed with anthracitic charcoal or wood coal, and were heated in simple closed retorts in order to produce zinc vapors. The production was then less then less than 50 Kg. of metal for each retort per day.

After 1910, processes for the production of zinc in higher quantities were developed, particularly using horizontal retorts and more frequently using parallel retorts, but always operating essentially in the same way as the small retorts that were previously used. It can be said that until 1936, the year in which the electrolytic processes first appeared, all the technological advances in the metallurgic extraction of zinc consisted in the development of better equipment for loading and unloading of the retorts, of better fuels for heating up the said retorts, and in ceramic innovations providing improved properties, such as, for example, ability to use higher temperatures, longer life and greater capacity or size.

Retort furnaces in which the zinc vapors condense at the exit of the retort, for reasons that are related to thermodynamics require that the carbon dioxide contained in the vapors is maintained in very low concentrations, to avoid the reoxidation of the zinc while it cools off. This requirement implies carbon consumption for reducing the produced carbon dioxide ($CO_2$). At the same time, the use of coke implies that the retort must operate also as a gas producer; this means that besides a high consumption of coke, the reactions in the retort must be highly endothermic, because of the double circumstance of the necessity of producing the carbon monoxide (CO) reforming the carbon dioxide ($CO_2$) and at the same time carrying out the reduction of the zinc oxide with a great demand of heat. All of these conditions have the result that the pyrometallurgical processes before mentioned, must work at temperatures not less than 1,150° C., and this means that the gas temperatures on the external walls of the retort must be very high-(1,400° C.). These factors constitute basic limitations for the profitability of the processes, and have forced them out from the existing technology field.

Many efforts were made in order to develop a practical reduction process in which the needed heat was obtained by adding charcoal in excess to the ore-coke mixture to be oxidized by air or oxygen entering into the reaction chamber. Blast furnace or vertical retort processes belong to this kind. Its development raised enormous difficulties; the first of them refered to the maintenance of the permeability of the gases on the fixed bed, for which it was necessary to develop a complex agglomeration procedure that, among other things, demanded the use of very special bituminous charcoal, of anthracite, of zinc oxide concentrates perfectly clasified, adhesives and a complete sintering plant. The presence of carbon dioxide ($CO_2$) on the fluid bed demanded that the temperatures all over the bed must be kept above 900° C. in order to avoid the zinc reoxidation, and therefore, the feed materials should be preheated. Another great problem that appeared was the zinc recovery in molten state; this was possible with the development of condensors operated with a mixture of molten zinc and lead, which needed to be recirculated in the range of 400 tons. per zinc ton. between two exact temperature levels.

The problems of preparing the ores to be loaded and the furnace construction required such a high capital investment, that the vertical retort process was abandoned, and in fact there were only two plants built in the world.

Another development known as the "Sterling" process consisted in providing the needed coke for the reduction and the electric energy in an open arc furnace. This process was tried mainly in Sweden and Norway, and abandoned basically because of the difficulty of controlling the furnace operation in such a way that it could produce a vapor condensable to liquid zinc.

Other difficulties that did not allow these processes to survive were: the heat transfered from the molten slag in the bath, to the slag not-reduced, which implied the use of very high temperatures in the slag, and consequently a very intense attack on the refractory material.

(b) Electrolytic processes.

Refering by example to zinc production, these processes involve dissolving the zinc oxides contained in the ores, using dilute sulphuric acid, forming zinc sulphate, then purifying the zinc sulphate solution in order to obtain a satisfactory electrolyte and finally recovering metallic zinc from the electrolyte as a high purity product using electrolysis.

The chemistry of the electrolytic processes seemed to be very easy until practice demonstrated that there are many factors that strongly influence the reactions. The complexity of the electrolytic processes essentially results from the very narrow compositional margins distinguishing the ores from which it is possible to deposit the zinc from a solution by electrolysis. Besides this, the low price of zinc in the market and the complexity of the plant that these processes require, impose the need for very high production volume and require using very high recovery processes to be profitable according to the required investment, Nevertheless, until today these electrolytic processes have been considered according to the state of the art as the only economic method for zinc production.

Further information on the developments up to the present of the pyrometallurgic and electrolytic processes in the extraction of metals from ores containing them with special reference to zinc, can be found on the third edition (1968) of the book "Zinc", in the monographic Series of the American Chemical Society, (author Tales W. Kaufmann, in a Hafmer edition). U.S. Pat. Nos.: 497,669 (Thomas Martin Morris, et al); 3,147,327 (Bennett Gregory Perry, et al); 3,262,774 (Victor Ernest Clifton); 3,434,947 (George Stcintveit, et al); 3,753,692 (Kenneth Arthur Bourchier, et al); 3,764,301 (Stephen William K. Morgan); 3,768,995 (Tomás Pérez) 3,867,268 (Paul Kawulka et al); 4,049,514 (George M. Freeman et al) British Pat. Nos. 948,855 (Albert Andre Joseph Quinton); 1,145,688 (Robert Nicaise); 1,149,760 (Michael John Loosemore); 1,404,245 (The Anaconda Company); 1,458,869 (Michael William Gammon); French Patents 1,364,372 (The National Smelting Company Limited); 2,002,137 (Compagnie des metaux D'overpelet-Lommel et de corphalie); German Patents 1,174,049 (Dr. Oskar Emert, et. al); 1,210,572 (Dr. Alfred Dietrich, et. al); Russian Patents 154,406 (T. Kh. Tserekov, et. al) South Africa Patents 652,804 (Robert Nicaise, et al); Japan Patents 74,748 (Satoshi Mukae, et al); 78,422 (Satoshi Mukae, et al).

The present invention refers to a pyrometallurgic process for the extraction of metals which, as metalic zinc are contained in ores, particularly in ores containing zinc, lead or cadmium oxides or their mixtures; that is, regardless the traditional disadvantages known for the pyrometallurgic processes, it is very economic and very profitable based in the required investment, specially for the extraction of zinc, lead and cadmium, because it overcomes those disadvantages as it will be evident for those skilled in the art.

DESCRIPTION OF THE INVENTION

Referring now to the process of the present invention, the starting materials used are ores as sulphides or as oxides. When the ores are as sulphides, they can be concentrated and roasted and thereafter used as starting materials in the process of the present invention or they can be just roasted and then used as starting materials. When the minerals are as oxides, they are fed directly to the process or concentrated and then fed to the process.

The process of the present invention involves the grinding of the starting material to a range particle size range from 100% being retained by 325 mesh, to particles of a maximum size of 7 millimeters in diameter. This grinding avoids other previous and expensive steps of conditioning the raw material, such as sintering nodulizing and other similar steps that are used at present.

The invention also includes a second step consisting in reducing the oxides of the starting material, feeding the ground raw material into a reactor having a fluidized bed that works isothermically with temperatures that fluctuate between 560° C. and 1,200° C., in a reducing medium produced by controlled combustion of natural gas, carried out at temperatures between 700° C. and 1,380° C. The result of the reduction is a gaseous stream that contains the vaporized metals present in the starting material.

The process involves also the step of instantaneous condensing of the vaporized metals contained in the effluent gaseous current from the reactor, using direct contact with water, in order to recover the metals in solid form; although still in solution and mixed with gangue, the metals are already in elemental state.

The process of the invention further comprises a separation step using sedimentation and filtration of the zinc and the rest of the metals present, from the water, and drying said metals in a reducing atmosphere, until a final humidity of 0% is reached.

Finally, according with the present invention, this process involves a recovery of the metals from the gangue using electroinductive evaporation and then separation of the metals by means of fractional distillation or alternatively by surface condensation.

The process is illustrated by the appended drawing which is a flow diagram showing the sequence of steps of the process above described. Also in the hereinbelow table, the advantages of the process of the invention can be seen.

FLOW DIAGRAM

In accordance with the flow diagram the process comprises 6 steps in combination as follows:

1.—Grinding ore at room temperature;
 2.—Reducing said ground ore with reducing agents to a gaseous mix comprising gangue;
 3.—Condensing the gaseous mix with wateer, to a metals and gangue solution as a product and inert gases as a second product which are vented to the atmosphere;
 4.—Separating water from said metals and gangue solution via sedimentation, filtration and drying to obtain a cake. The water is recycled to step 3;
 5.—Subjecting said cake to gaseous separation in order to yield the metals mix in gaseous form as product and gangue as a residue;
 6.—Selectively condensing said metal mix into each metal component according to ther different condensation temperatures.

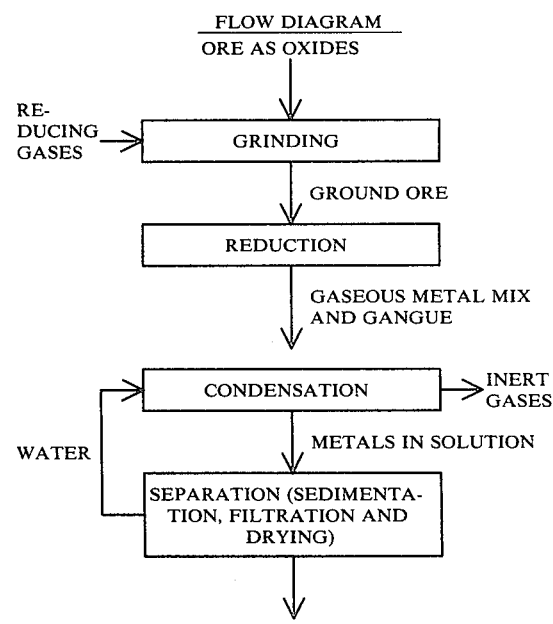

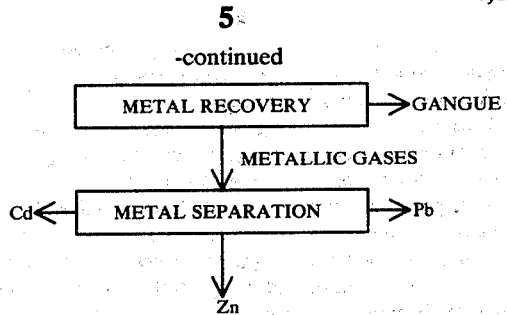

ADVANTAGES OF THE PROCESS

The process of the present invention offers the following advantages over all the prior pyrometallurgical processes:

The process uses gaseous reducing agents such as carbon monoxide, hydrogen, or a mixture thereof and it does not require solid reducing agents such as bituminous charcoal, coke or anthracitic charcoal. Natural gas is an abundant product and is easy to obtain in many countries that have many sources of ores that contain metalic oxides, such as zinc, lead, cadmium oxides or their mixtures.

The process is not affected by spalling of the raw material in the conditions of a reducing atmosphere, since it is pulverized previous to the reactor feeding. Different from the traditional processes where the down point of the raw materials limits the posibilities of their use, the process of the present invention is independent of this factor.

The process of the invention is a continuous process, while the processes according to the known technique operate in batches due to the required reduction time.

In the present process, vapors of zinc, lead, cadmium, or their mixtures contained in the effluent gases of the reactor, can be accompanied by a partial pressure of carbon dioxide ($CO_2$) between 0.20 to 1 atmosphere without this fact to interfere in the condensation of the elemental zinc.

Among the starting materials that can be used in this new process, are ores with metallic concentrations starting from 0.05% up to the stoichiometric concentrations.

The invention is illustrated by, but not limited to the following examples.

SPECIFIC EXAMPLES

TEST No. 1

A 40 kg sample of a flotation zinc concentrate calcined or roasted in a fluosolid type roaster. This sample is an average of the zinc concentrate used within a month by Zincamex, S. A., having an analysis of 60.8% Zn, 1.7% Pb and 0.52% Cd; 36.98% other materials. After grinding to a particle size in which 18% passes the 18 mesh, reduction was carried out with an air/natural gas ratio of 13:1, i.e. 27% excess of the stoichiometrical amount, at a temperature of 960° C. Results are summarized in table 1, the final product composition is 95.22% Zn, 92.14% Pb and 93.14% Cd. The test was carried out within one hour and 23.98 Kg of final product were recovered.

TEST No. 2

Similar steps were carried out with a sample taken randomly from the same source as in the above test. Operating temperature was 980° C. In this case the sample analysis is: 61.60% Zn, 1.62% Pb, 0.47% Cd and 36.31% other materials. 24.42 Kg of final product were recovered. Results are summarized in table 1.

TEST No. 3

Similar steps were carried out as in the above test, the zinc concentrate (available from Zincamex S. A.) having the highest average zinc content. As in the prior cases, analysis and results are summarized in table 1.

TEST No. 4

A lead concentrate was used as starting material, concentrated by flotation from an ore being as sulphide, it was roasted and then similar steps were carried out as in the above tests. Also results are summarized in table 1.

TABLE 1

| | RESULTS OF THE FOUR REPRESENTATIVE TESTS | | | | | | | | | | | | | |
|---|---|---|---|---|---|---|---|---|---|---|---|---|---|---|
| | | | | | OPERATION CONDITIONS | | | | RECOVERY EFFICIENCIES (%) | | | COMPOSITION AND YIELD OF METAL PRODUCED (%) | | |
| TEST | MINERAL FEED (1) ANALYSIS (%) | | | | SIZE PARTICLE | | AIR/NG NATURAL | TEMP (°C.) | N/G (3) EXCESS | | | | | | |
| No. | Zn | Pb | Cd | OTHERS | % | MESH | | | | Zn | Pb | Cd | Zn | Pb | Cd | Kg |
| 1 | 60.80 | 1.70 | 0.52 | 36.98 | 100 | 18 | 13 | 960 | 27% | 95.22 | 92.14 | 93.14 | 96.58 | 2.61 | 0.81 | 23.98 |
| 2 | 61.60 | 1.62 | 0.47 | 36.31 | 100 | 18 | 13 | 980 | 27% | 95.96 | 92.63 | 92.86 | 96.83 | 2.46 | 0.71 | 24.42 |
| 3 | 62.65 | 1.85 | 0.57 | 34.93 | 100 | 18 | 13 | 1000 | 27% | 97.12 | 93.77 | 93.28 | 96.41 | 2.75 | 0.84 | 25.24 |
| 4 | 12.69 | 50.55 | 0.62 | 36.14 | 100 | 18 | 13 | 1100 | 27% | 98.03 | 96.11 | 94.13 | 20.19 | 78.86 | 0.95 | 24.64 |

NOTES:
(1) MINERAL FEED AS OXIDE
(2) TEST OPERATING TIME = 1 HOUR/TEST
(3) NG = NATURAL GAS

Obviously the above described process, claimed below, can be used for obtaining other metals different from zinc, requiring them to be able to be transformed to their own oxides and being volatile.

We claim:

1. A process for obtaining metal values from ores containing volatilizable metals in the form of oxides or compounds convertible into oxides, which process comprises the steps of forming particles by grinding metal oxide-containing starting ores to a particle size in the range from 7 mm diameter maximum to 325 mesh minimum; isothermically reducing the metal oxides of the starting ore in a reactor in which said particles are formed into a fluidized bed at temperatures between 560° C. and 1,200° C. by a fluidizing gas comprising a reducing medium produced by controlled combustion of natural gas, thereby obtaining a gaseous mixture containing volatilized metals and gangue particles; condensing the metals to solidified form by direct contact with water; recovering the metals and the gangue from the resulting water by sedimentation and filtration; drying the metals and the gangue in a reducing atmosphere, and separating the metals from the gangue by vaporization of the metals.

2. A process according to claim 1, wherein the metals separated from the gangue are separated from each other by fractional distillation.

3. A process according to claim 1, in which the metal oxide present in the ore is zinc oxide and zinc metal is recovered.

4. A process according to claim 1, in which the metal oxide present in the ore is lead oxide and a lead metal is recovered.

5. A process according to claim 1, in which the metal oxide present in the ore is cadmium oxide and cadmium metal is recovered.

6. A process according to claim 1, wherein the starting ore has a metal concentration from 0.05% up to the stoichiometric concentration.

7. A process according to any one of claims 1 to 6, wherein the reducing medium contains carbon monoxide controlled combustion of natural gas.

8. A process according to any one of claims 1 to 5, in which the metallic effluent vapors from the reactor of the fluidized bed have a partial pressure between 0.01 and 0.50 atmosphere and the partial pressure of carbon dioxide therein is between 0.2 and 1 atmosphere.

* * * * *